Dec. 29, 1970 D. W. BRACKETT 3,551,023

PATHOLOGY SPECIMEN PROCESSING METHOD AND ARTICLE

Filed Jan. 17, 1969

INVENTOR
DANIEL W. BRACKETT

BY Henry E. Otto Jr.

ATTORNEY

United States Patent Office 3,551,023
Patented Dec. 29, 1970

3,551,023
PATHOLOGY SPECIMEN PROCESSING METHOD AND ARTICLE

Daniel W. Brackett, East Brunswick, N.J., assignor to International Business Machines Corporation, Armonk, N.Y., a corporation of New York Filed Jan. 17, 1969, Ser. No. 791,995
Int. Cl. G02b *21/34*
U.S. Cl. 350—95 8 Claims

ABSTRACT OF THE DISCLOSURE

A thin flexible plastic film, the size of a conventional glass pathology slide, is adhered by a border of pressure-sensitive adhesive to the top surface of a relatively thick and inflexible substrate. The substrate is larger than the film to provide a manually grippable portion. After a pathology specimen is placed on the unbonded top surface of the thin film, the user holds the grippable portion while immersing the specimen in conventional staining solvent. The specimen is then successively covered with conventional mounting medium and then cover-slipped with a thin flexible plastic film the same as the other film. The film-specimen-film sandwich and underlying substrate can now be placed under a microscope to view the specimen. The sandwich is strippable from the substrate and insertable into an aperture card for processing in data processing equipment. Both films and the substrate are of materials that are optically clear under intense magnification, and are also chemically resistant to the staining solvent, mounting medium and adhesive to minimize deterioration of the specimen and/or film after mounting.

This invention relates to a method and article to facilitate the processing, viewing, identification, storage and retrieval of pathology specimens.

BACKGROUND OF INVENTION

Pathology specimens are generally placed on a glass slide, stained, and coated with a liquid mounting medium that dissolves fingerprints and also preserves and adheres the specimen to the slide. The specimen is then covered with a thin glass sheet, dipped into solvent for final cleaning, then inspected under a microscope.

Glass slides are relatively costly. Also they are breakable and relatively thick, and hence they cannot be mounted in a record card of the type known as an "aperture card" for processing by data processing equipment. There is a need for a simple method and relatively inexpensive article that not only will facilitate the processing of pathology specimens in substantially the same manner as with conventional glass slides, but also will enable the specimen to be mounted on an aperture card or other record card that can be printed, punched or otherwise coded, and readily processed through and later retrieved by data processing equipment. However, more is required than merely mounting a pathology specimen carrier (instead of a photographic film chip) in an aperture card. Numerous problems are presented. The specimen must be mounted on a carrier which is flexible to avoid breakage, optically clear under intense magnification to permit viewing with a microscope, and chemically resistant to the staining and mounting solutions to prevent deterioration of the carrier and/or specimen during storage for over 20 years. The carrier must be easily handled. If it is thin and flexible, as it must be to permit mounting in an aperture card, it is difficult to handle before mounting. The carrier cannot be mounted to the aperture card before the specimen is stained and covered with mounting medium for these solutions would soil and probably damage the card. Some inexpensive means is required to facilitate handling of the thin flexible optically clear specimen-carrying film during staining, application of mounting medium, cover slipping of the specimen, and viewing—all of which are done prior to mounting. This means must be consistent with an overall pathology specimen processing method so that the method can be performed inexpensively and effectively.

SUMMARY OF THE INVENTION

Toward this end, and according to the invention, one optically clear thin plastic film, the size of a conventional glass pathology slide, is detachably adhered by pressure-sensitive adhesive to a substantially thicker substrate of optically clear plastic. The substrate is preferably larger than the film to permit gripping to facilitate the various manual operations, like applying the specimen to the unadhered side of the film, staining the specimen, applying mounting medium, applying a thin flexible cover slip or film like the first film over the specimen, and viewing under a microscope. After viewing, the film-specimen-film sandwich (i.e., the completely encased specimen) is stripped from the substrate. To facilitate this stripping, the adhesive by which the first film is adhered to the substrate preferably commences somewhat back from at least one edge of the film so that the user can insert his thumbnail or fingernail under that edge to initiate the removal of the sandwich. The adhesive is applied in a border like pattern around the edges of the first film so as to frame a large optically clear central area in which the specimen is placed.

Other objects, features and advantages will become apparent from the following more detailed description of the invention and from the accompanying drawing wherein.

DESCRIPTION

Figure 1:
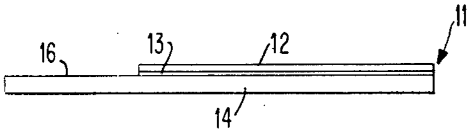
FIG. 1 is a side elevational view, to somewhat exaggerated scale, of a pathology specimen processing article embodying the invention.
Figure 2:
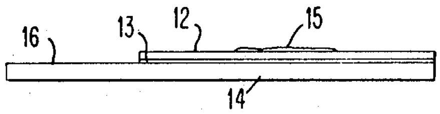
FIG. 2 is a side elevational view of the article with a pathology specimen thereon.

According to the invention and as shown in FIG. 1, a pathology specimen processing article 11 comprises a relatively thin flexible plastic film 12 removably bonded by a border 13 (see FIG. 4) of pressure sensitive adhesive in overlying relation to one portion of a relatively inflexible and thick plastic substrate 14. By way of example, film 12 may be of the order of about .002" thick, and substrate 14 of the order of about .050" thick. This assemblage is sold as an article of manufacture to the user. The user places a specimen 15 (such as animal tissue or a fluid or blood smear) on the unbonded upper side of film 12 (see FIG. 2) and well within its four edges (see FIG. 4).

Figure 3:
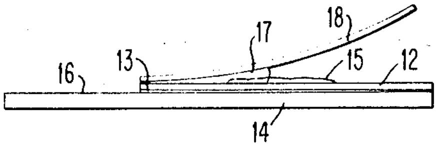
FIG. 3 is a side elevational view of the article and specimen with a cover slip being mounted thereon to provide an assemblage comprising a film-specimen-film sandwich and underlying substrate.

While gripping the uncovered remaining portion 16 of substrate 14, the user immerses specimen 15 in a conventional staining solvent (not shown). Next, a conventional liquid mounting medium 17 is placed over the specimen and adjacent areas to clean film 12 and preserve the specimen and provide a means of adhering a cover slip to the film. This mounting medium may, for example, be Permount, Fisher Scientific Company, Inc.'s brand of liquid adhesive mounting medium. After medium 17 is applied, specimen 15 is cover-slipped with a relatively thin plastic film 18 that preferably is of the same thickness, material and size as film 12. During cover slipping, film 18 preferably is aligned with one edge of film 12 (see FIG. 3) and then wiped toward the opposite edge to squeeze out excess mounting medium and prevent bubbles of air or fluid from being trapped between the films 12, 18. This will provide a film-specimen-film sandwich 19 (see FIGS. 4, 5) that completely envelops and protects the specimen and is removably attached by the pressure-sensitive adhesive border 13 to the thick plastic substrate 14. By gripping substrate portion 16, the user may now position the sandwich 19 under a microscope to view the specimen.

Figure 4:
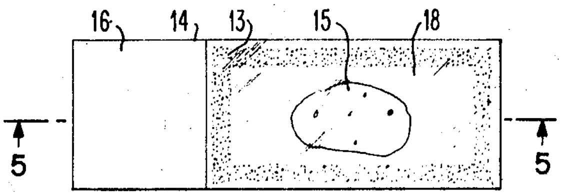
FIG. 4 is a plan view of the assemblage.
Figure 5:
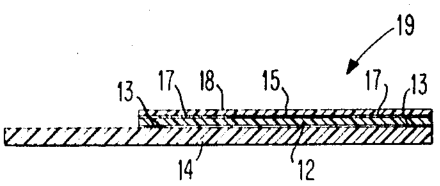
FIG. 5 is a sectional view taken along the line 5—5 of FIG. 4.
Figure 6:
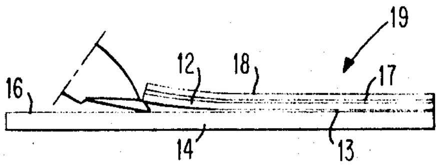
FIG. 6 is a side elevational view of the assemblage showing the sandwich in process of being stripped from the substrate.
Figure 7:
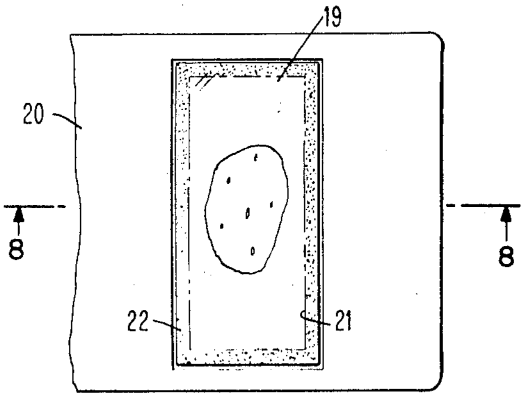
FIG. 7 is a plan view of the film-specimen-film sandwich mounted to an aperture-type card.
Figure 8:
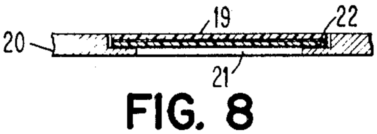
FIG. 8 is a sectional view, to an enlarged scale, taken along the line 8—8 of FIG. 7.

To strip the sandwich from substrate 14, the user inserts his thumbnail or the like under one edge of the film 12, as shown in FIG. 6, and then peels off the sandwich. To facilitate this removal, the adhesive border 13 is preferably set back from at least one edge of the film; e.g., from all four edges as best shown in FIG. 4. After removal, the sandwich 19 is mountable in an aperture-type card 20 that is preferably of the type illustrated in FIG. 7. This card, which can be of conventional cardstock, and conventional tabulating card size has an aperture 21 surrounded by a shoulder or ledge 22 formed by abrading or otherwise reducing the thickness of the cardstock immediately adjacent the aperture. The outer dimensions of ledge 22 circumscribe an area which preferably is only slightly larger than the area of the sandwich 19. Ledge 12 should be abraded to a depth sufficient to assure that the sandwich when mounted on the ledge 22, will be flush with or slightly below the surface of the record card 20 surrounding the ledge to facilitate processing and subsequent retrieval of the specimen-carrying card with data processing equipment. The sandwich is preferably adhered to ledge 22 by pressure-sensitive adhesive assisted or augmented by that provided as a residue of the adhesive border 13. Card 20 can be marketed as a card with an aperture surrounding an abraded shoulder free of adhesive, thus obviating the need for release paper; and before, or preferably after, mounting of the sandwich 19 on the ledge 22, the card may be imprinted, punched or otherwise processed. However, if preferred, card 20 may be of a more conventional type embodying a pressure-sensitive adhesive coating on the aperture-surrounding ledge, which coating is covered by a temporary glassine release paper that covers the adhesive until the sandwich is to be mounted.

Substrate 14 may be disposed of after the sandwich is stripped therefrom for mounting in the record card 20, or the substrate may be reused by bonding another film (like film 12) to it. Also, film 12 may be weakly heat sealed to the substrate (rather than being sealed by pressure-sensitive adhesive) so as to be strippable from the substrate.

According to important features of the invention, the films 12, 18 and substrate 14 are of materials that are optically clear under intense magnification to permit viewing with a microscope, and are chemically resistant to the staining and mounting solutions. Films 12, 18 are thin and flexible to permit processing of the record card without cracking or breaking the mounted sandwich or causing card jams.

The substrate 14 preferably is relatively rigid to facilitate handling, staining and positioning of the specimen under a microscope.

Of the many materials tested and considered, it was found that best results were achieved when films 12 and 18 were formed of chlorotrifluoroethylene copolymerized with small amounts of at least one other fluorinated monomer; e.g., Aclar, Allied Chemical Company's brand of polychlorotrifluoroethylene. And, excellent results were obtained using a substrate 14 comprising a clear water white epoxy based on the repetition of the basic epoxide group

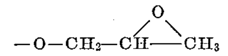

Excellent results were also obtained with a substrate comprising a clear water white polycarbonate based on the repetition of the diethylene glycol bis-alkyl carbonate

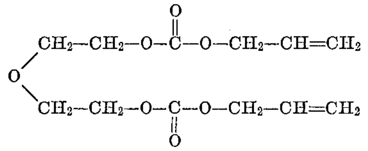

e.g., 100 parts by weight of Emerson and Cuming, Inc.'s Stycast 1629 Part A and a similar quantity of Part B, will produce an epoxy of the above-described type. The pressure-sensitive adhesive is preferably a polypropylene hot melt blend, such as the Eastbond M–5L brand of Eastman Chemical Products, Inc.

It will be apparent that the foregoing and other changes may be made without departing from the spirit, scope, and teaching of the present invention. Accordingly, the method and article herein disclosed is to be considered merely as illustrative, and the scope of the invention is to be limited only as specified in the claims.

What is claimed is:

1. A method of processing pathology specimens, comprising the steps of providing an optically clear thin flexible film having one side removably adhered to a thicker substantially rigid optically clear substrate, the film being free of adhesive immediately adjacent at least one edge, placing a pathology specimen on the unadhered side of the film, staining the specimen while manually gripping the substrate, applying an optically clear thin flexible cover film over the specimen to prevent contamination and permit viewing while the resultant film-specimen-film sandwich is adhered to the substrate, removing the sandwich from the substrate by inserting one's thumbnail or the like between the substrate and sandwich along such edge and peeling the sandwich off the substrate, and mounting the sandwich to a record card that is capable of carrying coded indicia and is retrievable by data processing techniques.

2. A method of processing pathology specimens, comprising the steps of providing an optically clear thin flexible film having one side removably adhered to a larger size optically clear substrate to provide a significant manually grippable substrate portion not covered by such film, placing a pathology specimen on the unadhered side of the film, staining the specimen while gripping said portion to support the film and specimen during staining, applying mounting medium to the specimen, applying a cover slip of optically clear thin flexible film over the specimen to prevent contamination and permit viewing while the resultant film-specimen-film sandwich is adhered to the substrate, stripping the sandwich from the substrate, and mounting the sandwich on a record card that is retrievable by data processing techniques.

3. The method according to claim 2, wherein the thin plastic film is removably adhered to the substrate by a border-like pattern of pressure-sensitive adhesive adjacent the edges of the film.

4. The method according to claim 2, wherein the optically clear films are formed of a polymer of chlorotrifluoroethylene, and the substrate is formed of at least one of the materials taken from the group consisting of a clear water white epoxy and a clear water white polycarbonate.

5. An article of manufacture for use in processing pathology specimens, comprising a relatively thick and rigid substrate providing a manually grippable portion, a relatively thin flexible film, pressure-sensitive adhesive means detachably adhering one side of the film to another portion of the substrate with a border-like adhesive pattern adjacent the edges of the film, said film being adapted to support on its other side and within such border a pathology specimen for staining, preserving and viewing, said manually grippable portion being available to facilitate handling, staining, etc. of the specimen and eventual stripping of the film from the substrate, said film and substrate being of materials which are optically clear under intense magnification to provide a clear view of the specimen and which are chemically resistant to specimen staining and preserving solutions to prevent deterioration, and said specimen being adapted to be covered by a cover slip formed of a film of the same material as said thin flexible film to provide a film-specimen-film sandwich that is optically viewable and then strippable from the substrate for mounting in a record element.

6. An article of manufacture according to claim 5, wherein said substrate and film are of optically clear non-breakable plastic materials, and the adhesive does not extend up to at least one edge of the film to enable insertion of a human thumbnail or the like under such edge to facilitate eventual stripping from the substrate.

7. An article of manufacture according to claim 5, wherein the optically clear substrate comprises at least one of the materials taken from the group consisting of a clear water white epoxy based on the repetition of the basic epoxide group

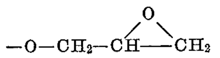

and a clear water white polycarbonate based on the repetition of the diethylene glycol bis-alkyl carbonate

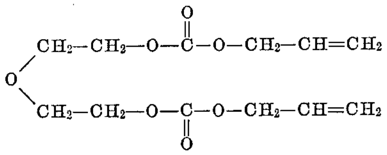

8. An article of manufacture according to claim 5, wherein the optically clear film comprises a chlorotrifluoroethylene copolymerized with small amounts of at least one other fluorinated monomer.

References Cited

UNITED STATES PATENTS

| | | | |
|---|---|---|---|
| 2,025,488 | 12/1935 | Yap | 350—95UX |
| 2,801,568 | 8/1957 | Dakin | 350—92 |
| 3,307,036 | 2/1967 | Bouvelle | 350—95UX |

FOREIGN PATENTS

| | | | |
|---|---|---|---|
| 400,607 | 4/1966 | Switzerland | 350—95 |

DAVID SCHONBERG, Primary Examiner

T. H. KUSMER, Assistant Examiner

U.S. Cl. X.R.

40—158; 350—320; 356—244